United States Patent [19]

Saito

[11] Patent Number: 5,655,160

[45] Date of Patent: Aug. 5, 1997

[54] DISTANCE MEASURING APPARATUS

[75] Inventor: Tatsuo Saito, Saitama, Japan

[73] Assignee: Fuji Photo Optical Co., Ltd., Saitama, Japan

[21] Appl. No.: 657,906

[22] Filed: Jun. 7, 1996

[30] Foreign Application Priority Data

Jun. 9, 1995 [JP] Japan .................................. 7-143067

[51] Int. Cl.$^6$ ............................................. G03B 13/16
[52] U.S. Cl. ................................................. 396/106
[58] Field of Search ......................... 354/403; 250/201.4, 250/201.6; 348/348, 350, 349; 396/106

[56] References Cited

U.S. PATENT DOCUMENTS 4,381,523  4/1983  Eguchi et al. ................... 348/350 X
4,518,242  5/1985  Toyama ............................ 354/403
4,592,638  6/1986  Kaneda et al. .................... 354/403

*Primary Examiner*—W. B. Perkey
*Attorney, Agent, or Firm*—Leydig, Voit & Mayer

[57] ABSTRACT

There is provided a distance measuring apparatus capable of avoiding a situation in which the distance measurement time is prolonged. This apparatus executes distance measurement of an active method and distance measurement of a passive method. When a determining portion detects that the distance measurement of the passive method using a large number of photodiodes exceeds a predetermined time, a distance-value selecting circuit selects the distance measurement result of the active method as a distance measurement value.

11 Claims, 5 Drawing Sheets

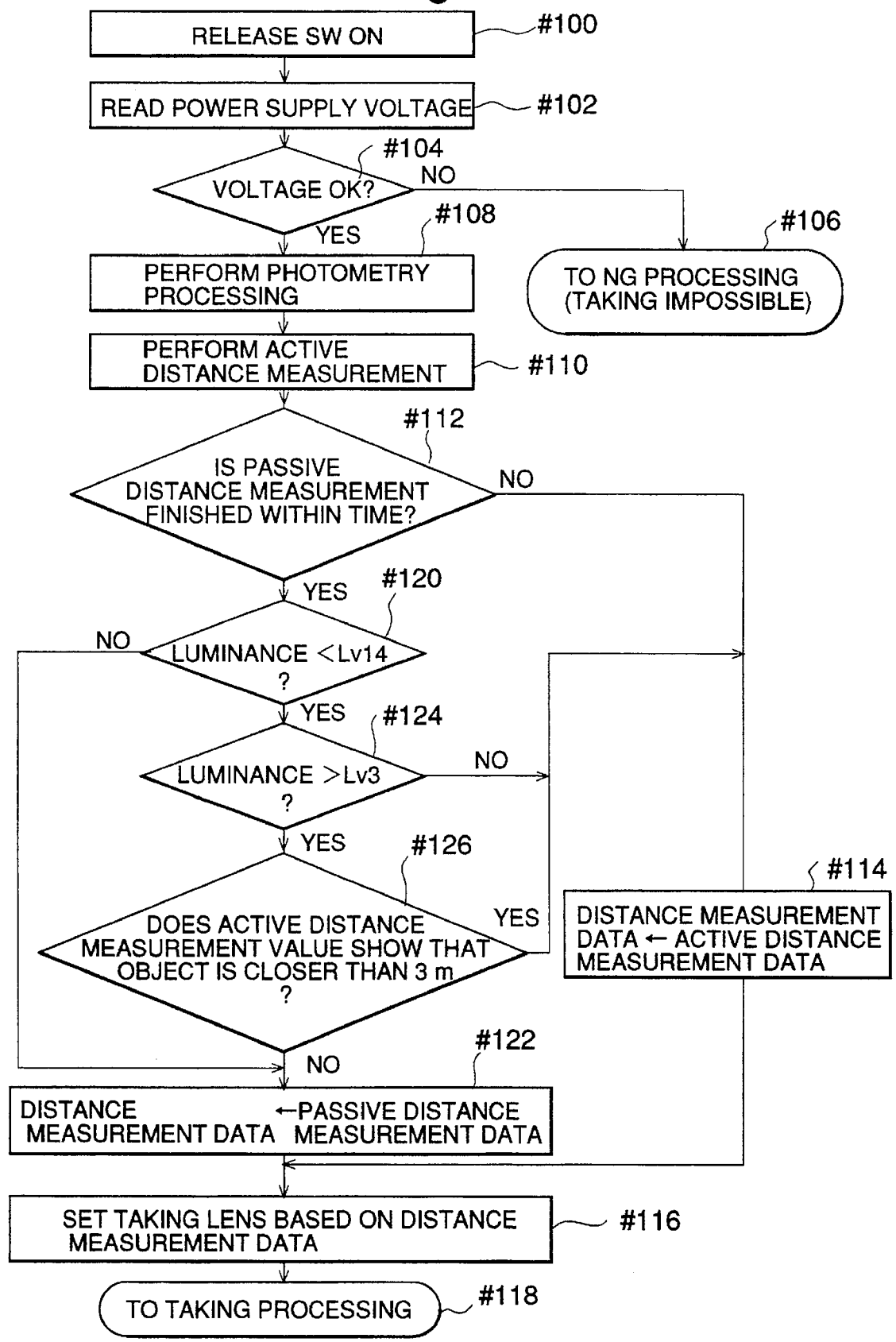

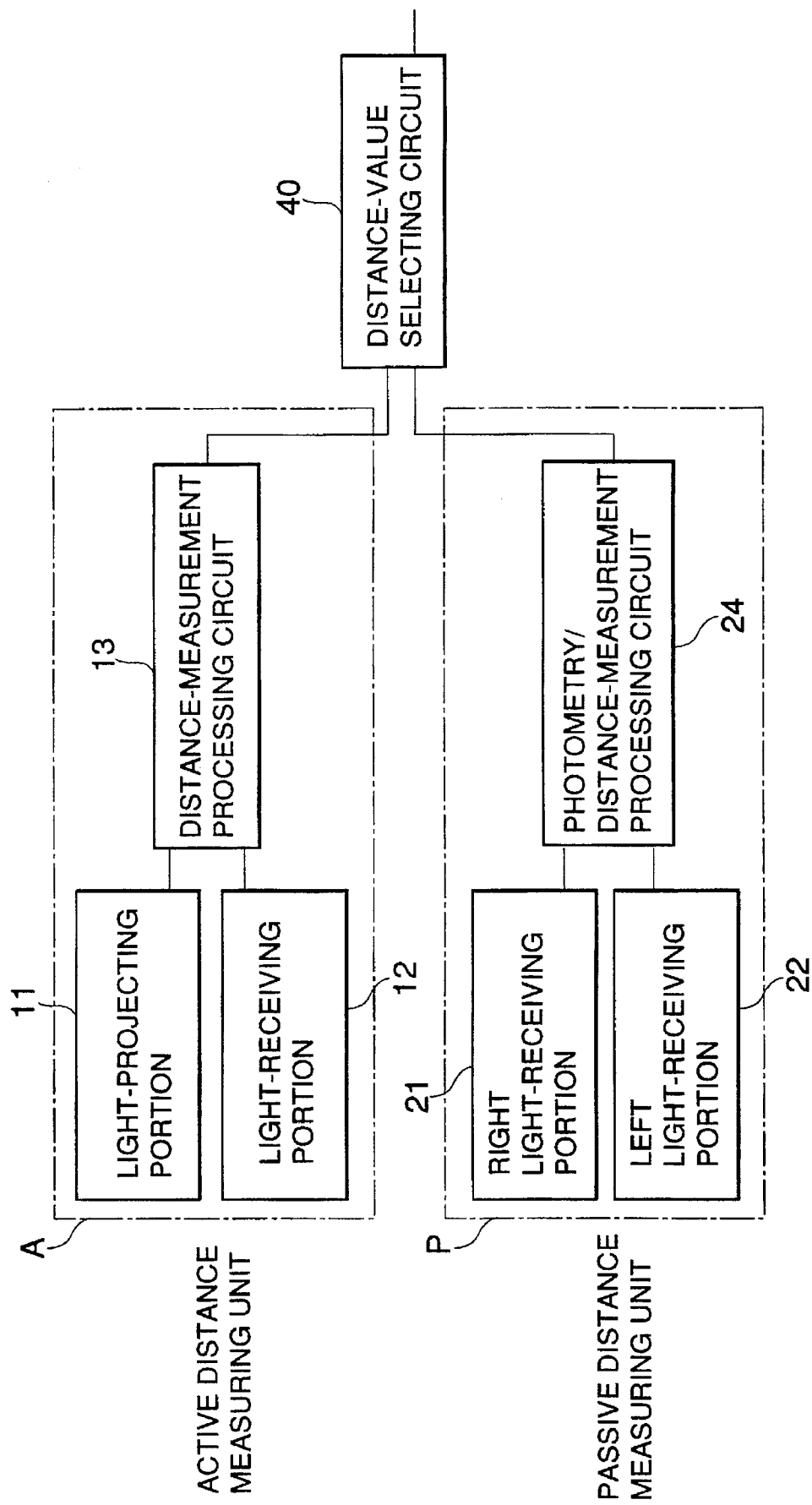

DISTANCE MEASURING APPARATUS

BACKGROUND OF THE INVENTION

1. Field of the Invention

The present invention relates to a distance measuring apparatus for a camera which automatically measures a distance to an object.

2. Related Background Art

As such a distance measuring apparatus for a camera, a trigonometric distance measuring apparatus of an active method is well known which has a light source for distance measurement such as an LED and measures the distance to an object in combination with a light-receiving element.

As a distance measuring apparatus of another method, a trigonometric distance measuring apparatus of the passive method is known which has no light source for distance measurement, receives the natural light reflected by the object through two optical systems, and measures the distance to the object in accordance with a phase difference between two optical images obtained by the respective optical systems, and the like.

SUMMARY OF THE INVENTION

It is an object of the present invention to provide a distance measuring apparatus capable of avoiding a situation in which the distance measurement time is prolonged.

According to the first aspect of the present invention, there is provided a distance measuring apparatus comprising first distance measuring means of an active method for projecting distance measuring light toward an object to measure a distance to the object based on a position where reflected light is condensed, second distance measuring means of a passive method for receiving natural light reflected by the object with two optical systems to measure the distance to the object based on two optical images obtained by the systems, and distance-measurement value selecting means for selecting either one of distance measurement results obtained by the first and second distance measuring means to output it. The distance-measurement value selecting means comprises determining means for detecting that a distance measurement time by the second distance measuring means exceeds a predetermined time, and selecting the distance measurement value of the first distance measuring means.

In the distance measuring apparatus of the second aspect, the second distance measuring means is constituted by a photodetector array prepared by arraying a plurality of photodetectors each for outputting a signal in accordance with an intensity of received light. In the determining means, first means for outputting a detection signal when an integrated value of an output from each photodetector exceeds a predetermined reference level is arranged in correspondence with each photodetector. Second means detects the output timing of each detection signal. When any one of the detection signals is not detected within the predetermined time, the distance measurement value of the first distance measuring means is selected.

Each distance measuring apparatus according to the present invention comprises two types of distance measuring means, i.e., the first distance measuring means of the active method and the second distance measuring means of the passive type. The distance is measured by both the distance measuring means.

In the distance measuring apparatus of the present invention, the determining means detects that the distance measurement time of the second distance measuring means by the passive method exceeds the predetermined time. When the foregoing detector is made, the distance measurement value of the first distance measuring means of the active method is selected and output.

In the distance measuring apparatus of the second aspect, the intensity of light received by each photodetector is detected at the detection timing of the detection signal output from the first means. When any one of the detection signals is not detected within the predetermined time, the second means determines that the distance measurement value by the passive method is not obtained within the predetermined time, and stops the distance measurement of the passive method to select the distance measurement value of the first distance measuring means of the active method.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a flow chart to show the operation of the distance measuring apparatus according to the embodiment of the present invention; and FIG. 6 is a block diagram to show a distance measuring apparatus according to another embodiment of the present invention.

DESCRIPTION OF THE PREFERRED EMBODIMENTS

The distance measuring apparatus of the above-described active method itself projects light toward an object and receives the reflected light to measure the distance. Therefore, the time spent for distance measurement does not greatly vary depending on the luminance of the external field.

On the other hand, of the distance measuring apparatuses of the above-described passive method, the distance measuring apparatus of a type for receiving the natural light reflected by the object with photodiodes to measure the distance is arranged such that the distance measurement is finished within a relatively short time when the object image is relatively bright. However, when the object image is dark, the time required for distance measurement tends to increase. In this manner, since the distance measurement result tends to greatly depend on the luminance of the object in the distance measuring apparatus of the passive method using the photodiodes, the distance measurement time greatly varies depending on the luminance of the object.

The present invention has been made in consideration of the above problems. An embodiment of the present invention will be described below with reference to the accompanying drawings.

Figure 1:
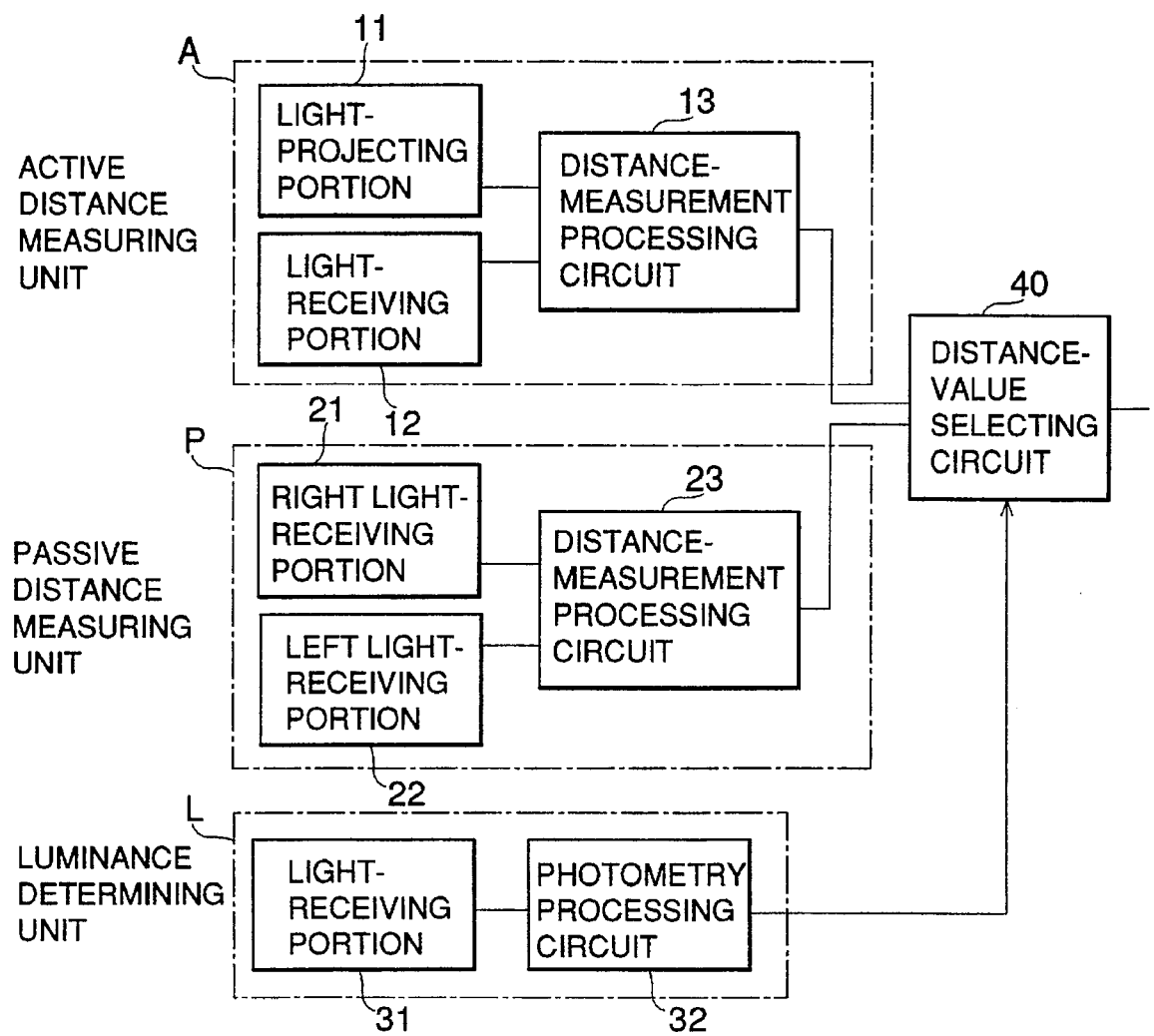
FIG. 1 is a block diagram to schematically show the arrangement of a distance measuring apparatus according to an embodiment of the present invention.
Figure 2:
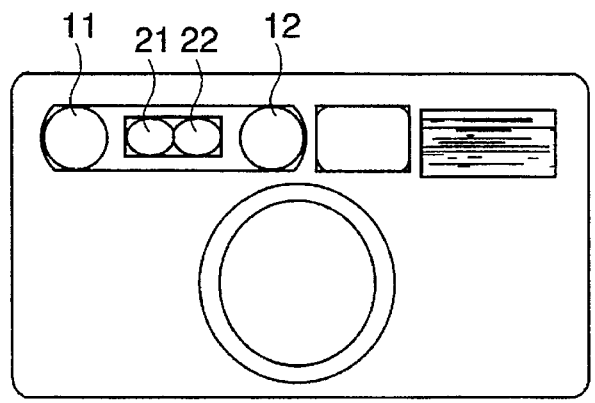
FIG. 2 is a front view to show a camera having the distance measuring apparatus according to the embodiment of the present invention.
Figure 3:
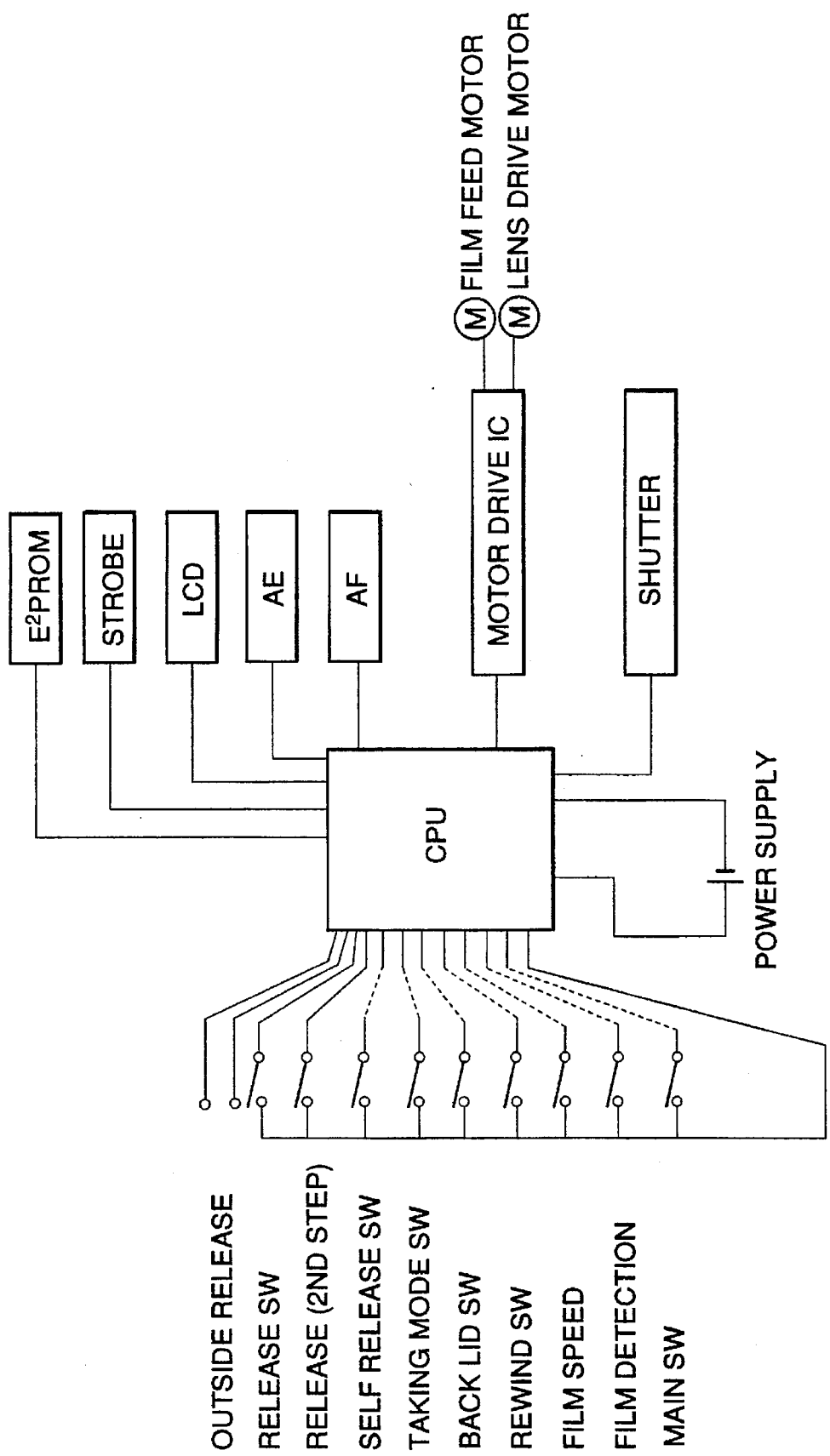
FIG. 3 is a block diagram to schematically show the internal arrangement of the camera shown in FIG. 2.

FIG. 1 shows the schematic arrangement of a distance measuring apparatus according to this embodiment, and FIG. 2 shows the outer appearance of a camera as one application of this distance measuring apparatus. FIG. 3 is a block diagram to schematically show the internal arrangement of this camera. This distance measuring apparatus comprises an active distance measuring unit A for executing trigonometric distance measurement of the active method, a passive distance measuring unit P for executing trigonometric distance measurement of the passive method, a luminance determining unit L for detecting the luminance of the external field, and a distance-value selecting circuit 40 for selecting distance measurement values obtained from the two distance measuring units.

The active distance measuring unit A comprises a light-projecting portion 11 constituted by an LED or the like for projecting distance measuring light toward an object, and a light-receiving portion 12 constituted by a PSD or the like for receiving the reflected light (see FIG. 2). The active distance measuring unit A further comprises a distance-measurement processing circuit 13 for calculating the distance to the object based on the light-projecting/light-receiving result. Note that the distance measurement value obtained by the active distance measuring unit A is supplied to the distance-value selecting circuit 40.

The passive distance measuring unit P comprises two optical systems for receiving the reflected light of the natural light by the object, i.e., right and left light-receiving portions 21 and 22 (see FIG. 2). The passive distance measuring unit P further comprises photodiode arrays 50 (see FIG. 4) for receiving two optical images, a distance-measurement processing circuit 23 for calculating the distance to the object based on signals from the photodiode arrays 50, and the like. Note that the distance measurement value obtained by the passive distance measuring unit P is also supplied to the distance-value selecting circuit 40.

The luminance determining unit L utilizes an AE portion (automatic exposure portion) of all the constituents components of the camera shown in FIG. 3. The luminance determining unit L comprises a light-receiving element for controlling the exposure, e.g., a light-receiving portion 31 formed of a CdS or the like, a photometry processing circuit 32 for calculating the luminance of the external field based on the light-receiving result, and the like.

The distance-value selecting circuit 40 selects one of the distance measurement values measured by the respective measuring units A and P based on the luminance of the external field obtained by the luminance determining unit L and the like, and outputs it.

Figure 4:
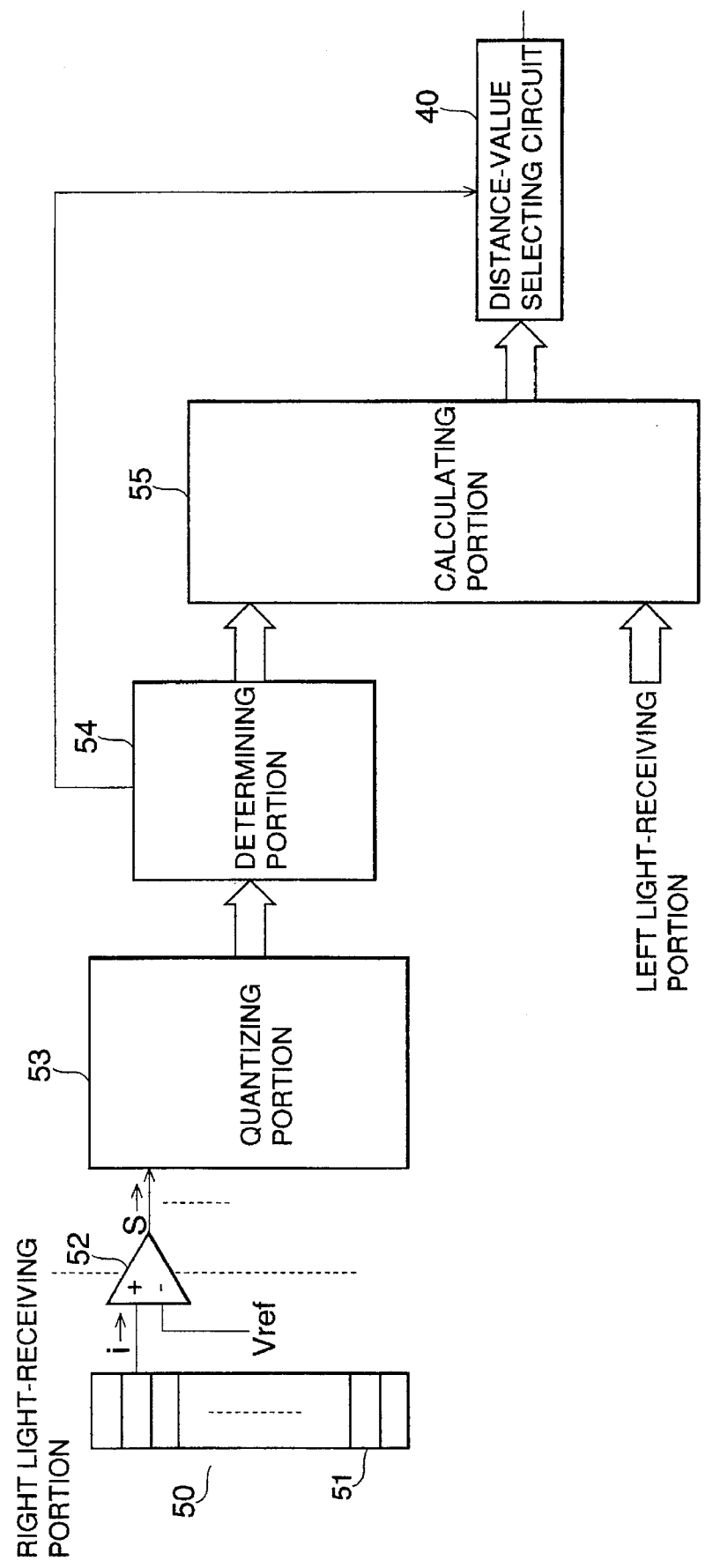
FIG. 4 is a block diagram to show the arrangement of a passive distance measuring unit.

FIG. 4 shows a more detailed arrangement of the passive distance measuring unit P. Each light-receiving portion of the passive distance measuring unit P is constituted by the photodiode array 50 prepared by arraying a plurality of photodiodes 51. Each photodiode 51 outputs a current in accordance with the intensity of received light. This current is integrated by the junction capacitance of the photodiode 51, and the integrated value is output as a signal i. A comparator 52 is arranged in correspondence with each photodiode 51. The output signal i from each photodiode 51 is supplied to the corresponding comparator 52 to be compared with a reference voltage $V_{ref}$. When the level of the output signal i exceeds the level of the reference voltage $V_{ref}$, the comparator 52 outputs a signal S to a quantizing portion 53.

The quantizing portion 53 detects a time (response time) until the signal S is output. Since the response time of the signal S is a time until the level of the signal i as the integrated value reaches the level of the reference voltage $V_{ref}$, the intensity of the light received by the photodiode 51 is converted into the length of the response time of the signal S. The response time of the signal S is measured by counting clocks output from a CPU. In this manner, the contrast of the object image received by the light-receiving portion can be obtained based on the response time of the signals S corresponding to the respective photodiodes 51.

Since the left light-receiving portion 22 has the same arrangement from the photodiode array 50 to a determining portion 54, its arrangement is not illustrated in FIG. 4.

Quantized data of the right and left light-receiving portions output from the quantizing portions 53 are supplied to a calculating portion 55 through the determining portions 54. The distance to the object (distance measurement value) is calculated based on both the quantized data by the calculating portion 55, and the result is supplied to the distance-value selecting circuit 40. The passive distance measuring unit P obtains the distance measurement value in this manner.

Next, the function of the determining portion 54 will be described.

The quantized data output from each quantizing portion 53 is supplied to the calculating portion 55 through the corresponding determining portion 54. The determining portion 54 performs the following determination. As described above, the response time of the signal S is measured by counting clocks output from the CPU. The determining portion 54 detects the response time of the signal S output from each photodiode 51 and checks whether all the signals S to be detected are detected within a predetermined time. For example, if the object image detected by the photodiode array 50 partially has a dark area, the response time of the signal S corresponding to the photodiode 51 at that portion is increased to delay the response. Occurrence of this response delay in some photodiodes 51 increases the time to obtain the distance measurement value from the light-receiving portion to which this photodiode array 50 belongs. For this reason, even if the response time of each signal S is detected, when only one signal S is not obtained within the specified time, the distance measurement calculation is immediately stopped, and the result is transmitted to the distance-value selecting circuit 40. In this case, the distance-value selecting circuit 40 selects the distance measurement result of the active distance measuring unit A side.

Note that the distance-measurement processing circuits 13 and 23, the photometry processing circuit 32, the distance-value selecting circuit 40, the determining portion 54, and the like are arranged within the CPU shown in FIG. 3.

The operation of this distance measuring apparatus will be described below with reference to FIG. 5.

First, when a release switch (see FIG. 3) is depressed with the camera facing the object (#100), a power supply voltage is read in to check the voltage value (#102 and #104). If the read voltage value does not reach a threshold value ("NO"

in #104), the flow shifts to predetermined NG processing (#106) to inform the user that the picture taking process is impossible.

When the read voltage value reaches the threshold value ("YES" in #104), photometry processing of detecting the luminance of the external field is performed by the luminance determining unit L (#108), and distance measurement of the active method is performed in the active distance measuring unit A (#110).

Simultaneously, distance measurement of the passive method is performed in the passive distance measuring unit P, and each determining portion 54 described above checks whether the passive distance measurement in the passive distance measuring unit P is finished within the specified time (#112). At this time, if the determining portion 54 determines that the distance measurement in the passive distance measuring unit P is not finished within the specified time ("NO" in #112), the distance-value selecting circuit 40 selects the distance measurement value of the active distance measuring unit A (active data) and outputs it as distance measurement data (#114). The subsequent picture processing such as setting a taking lens based on the set distance measurement data (#116) is executed based on this distance measurement value output from the distance-value selecting circuit 40 (#118).

On the other hand, if the distance measurement in the passive distance measuring unit P is finished within the specified time ("YES" in #112), the measurement distance results in both the measuring units A and P are supplied to the distance-value selecting circuit 40.

Next, the distance-value selecting circuit 40 checks whether the luminance of the external field obtained by the luminance determining unit L reaches high-luminance level of Lv14 or more (#120). When the luminance of the external field is high, the accuracy of distance measurement may decrease because the light-receiving portion 12 of the active method cannot properly receive the reflected light of distance measuring light; in the passive method, the reliability of the distance measurement value is high because the light quantity of the natural light reflected by the object increases. For this reason, if the luminance of the external field obtained by the luminance determining unit L is Lv14 or more ("NO" in #120), the distance-value selecting circuit 40 selects the distance measurement value of the passive distance measuring unit P (passive distance measurement data) and outputs it as distance measurement data (#122). The subsequent picture taking processing such as setting the taking lens based on the set distance measurement data (#116) is executed based on this distance measurement value output from the distance-value selecting circuit 40 (#118).

On the other hand, if the luminance of the external field is Lv14 or less ("YES" in #120), it is further checked whether the luminance of the external field is as low as Lv3 or less (#124). When the luminance of the external field is low, the reflected light quantity of the natural light is small, and the reliability is low in the passive method; in the active method, the reliability of the distance measurement value is high because the reflected light of the distance measuring light is properly detected at the light-receiving portion 12. For this reason, if the luminance of the external field obtained by the luminance determining unit L is Lv3 or less ("NO" in #124), the distance-value selecting circuit 40 selects the distance measurement value of the active distance measuring unit A (active distance measurement data) and outputs it as distance measurement data (#114). The subsequent picture taking processing is executed based on this distance measurement value output from the distance-value selecting circuit 40 (#116 and #118).

As described above, when the luminance of the external field is at high-luminance level of Lv14 or more or at low-luminance level of Lv3 or less, the distance-value selecting circuit 40 immediately selects one of the distance measurement values. When the luminance level is an intermediate luminance level of 3<Lv<14, the distance-value selecting circuit 40 selects the distance measurement value as follows.

The distance-value selecting circuit 40 checks whether the distance to the object is below 3 m (#126) based on the distance measurement result of the active distance measuring unit A. Since the distance measuring light is projected toward the object, and the reflected light is received in the active method, there is a limit on the light-projecting distance of the distance measuring light. If the distance to the object were too far, the reflected light would be insufficient, resulting in lowering the accuracy of distance measurement or disabling the distance measurement. Thus, if the distance measurement result by the active distance measuring unit A shows that the object is closer than 3 m ("YES" in #126), the distance-value selecting circuit 40 selects the distance measurement value of the active distance measuring unit A (active distance measurement data) having higher reliability, and outputs it as distance measurement data (#114). The subsequent picture taking processing is executed based on this distance measurement value output from the distance-value selecting circuit 40 (#116 and #118). On the other hand, if the distance measurement result by the active distance measuring unit A shows that the object is as far as 3 m or more ("NO" in #126), the distance-value selecting circuit 40 selects the distance measurement value of the passive distance measuring unit P (passive distance measurement data) and outputs it as distance measurement data (#122). The subsequent picture taking processing is executed based on the distance measurement value output from the distance-value selecting circuit 40 (#116 and #118).

In the distance measuring apparatus of this embodiment, of the distance measurement values obtained by the active and passive distance measuring units A and P, the distance measurement value having higher reliability can be selected. In addition, a situation in which the distance measurement time is prolonged can be avoided.

The above-described embodiment exemplifies the case in which the quantized data output from each quantizing portion 53 is checked in the corresponding determining portion 54. In addition to this, e.g., the determining portion 54 may be arranged on the preceding stage of the quantizing portion 53 to detect the response delay of the supplied signal S. Alternatively, the determining portion 54 may be arranged on the subsequent stage of the calculating portion 55 to detect the case in which the calculation result is not obtained within the predetermined time. In this manner, the arrangement position of the determining portion 54 is not limited to the position in the above embodiment as far as the determining portion 54 can detect the delay of the signal S output from each comparator.

In the above embodiment, the luminance of the external field is detected by the luminance determining unit L. Alternatively, in an embodiment shown in FIG. 6, the luminance of the external field can be obtained by a photometry/distance-measurement processing circuit 24 based on the light-receiving results of the respective light-receiving portions 21 and 22 in the passive distance measuring unit P.

Although the passive distance measurement is performed upon completion of the active distance measurement in each embodiment described above, the passive distance measurement can be executed first. In this case, if the distance measurement value of the passive distance measurement is not obtained within the predetermined time, the passive distance measurement is immediately stopped to perform the active distance measurement.

As has been described above, in the distance measuring apparatus of the present invention, when the determining means detects that the distance measurement time by the second distance measuring means exceeds a predetermined time, the distance measurement value of the first distance measuring means is selected. With this arrangement, even when the distance measurement of the passive method spends a long time due to a low luminance of the object image or the like, the distance measurement value of the active method is immediately selected. Therefore, a situation in which the distance measurement time is prolonged can be avoided regardless of the luminance of the object.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 143067/1995 filed on Jun. 9, 1995 is hereby incorporated by reference.

What is claimed is:

1. A distance measuring apparatus for measuring a distance to an object, comprising:

first distance measuring means of an active method for projecting distance measuring light toward said object to measure the distance measuring the distance to the object based on a position where reflected light by the object is condensed;

second distance measuring means of a passive method having tow optical systems for receiving natural light reflected by said object to measure the distance to the object based on two optical images obtained by the two optical systems, said second distance measuring means including a plurality of photodetectors arranged in an array for outputting a signal in accordance with an intensity of received light; and distance-measurement value selecting means for selecting one of two distance measurement values obtained by said first and second distance measuring means for output, said distance-measurement value selecting means including 1) a plurality of comparing means, respectively arranged in correspondence with the plurality of photodetectors, for outputting signals when integrated values of outputs from the photodetectors exceed a predetermined reference level, and 2) timing detecting means for detecting output timings of the signals from the plurality of comparing means, and selecting the distance measurement value obtained by said first distance measuring means when, of the signals from the plurality of comparing means, at least one signal is not detected within a predetermined time.

2. An apparatus according to claim 1, wherein the time required for distance measurement by said second distance measuring means exceeds said predetermined time when an intensity of natural light reflected by said object is low.

3. An apparatus according to claim 1, wherein said distance-measurement value selecting means selects the distance measurement value obtained by said second distance measuring means for output when the time required for distance measurement by said second distance measuring means does not exceed said predetermined time, and a luminance value of an external field is not less than a predetermined luminance level.

4. An apparatus according to claim 3, wherein said predetermined level is Lv14.

5. An apparatus according to claim 3, wherein the luminance of the external field is obtained based on an output from said second distance measuring means.

6. An apparatus according to claim 1, wherein said distance-measurement value selecting means selects the distance measurement value obtained by said first distance measuring means for output when the time required for distance measurement by said second distance measuring means does not exceed the predetermined time, and a luminance value of an external field is not more than a predetermined luminance level.

7. An apparatus according to claim 6, wherein the predetermined luminance level is Lv3.

8. An apparatus according to claim 6, wherein the luminance of the external field is obtained based on an output from said second distance measuring means.

9. An apparatus according to claim 1, wherein said distance-measurement value selecting means selects the distance measurement value obtained by said second distance measuring means for output when the time required for distance measurement by said second distance measuring means does not exceed the predetermined time, a luminance of an external field falls within a predetermined range, and the distance to the object obtained by said first distance measuring means is not less than a predetermined distance.

10. An apparatus according to claim 9, wherein the predetermined distance is 3 m.

11. An apparatus according to claim 9, wherein the luminance of the external field is obtained based on an output from said second distance measuring means.

* * * * *